United States Patent
Liu et al.

(10) Patent No.: US 11,203,443 B2
(45) Date of Patent: Dec. 21, 2021

(54) CONTROL METHOD FOR UNMANNED AERIAL VEHICLE AFTER THE UNMANNED AERIAL VEHICLE HAS BEEN DISASSEMBLED AND UNMANNED AERIAL VEHICLE

(71) Applicant: SZ DJI TECHNOLOGY CO., LTD., Shenzhen (CN)

(72) Inventors: Lijian Liu, Shenzhen (CN); Yongsen Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 74 days.

(21) Appl. No.: 16/703,443

(22) Filed: Dec. 4, 2019

(65) Prior Publication Data
US 2020/0108945 A1 Apr. 9, 2020

Related U.S. Application Data

(63) Continuation of application No. PCT/CN2017/088449, filed on Jun. 15, 2017.

(51) Int. Cl.
| | |
|---|---|
| *B64C 9/02* | (2006.01) |
| *B64D 45/00* | (2006.01) |
| *B64C 39/02* | (2006.01) |
| *B64D 47/02* | (2006.01) |
| *G06F 21/31* | (2013.01) |

(52) U.S. Cl.
CPC ........ *B64D 45/0015* (2013.01); *B64C 39/024* (2013.01); *B64D 47/02* (2013.01); *G06F 21/31* (2013.01); *B64C 2201/042* (2013.01); *B64C 2201/14* (2013.01)

(58) Field of Classification Search
CPC ... B64D 45/0015; B64C 39/024; G06F 21/31; G06F 21/86; G05B 19/048; B64F 5/40
USPC .......................................... 340/5.8
See application file for complete search history.

(56) References Cited

U.S. PATENT DOCUMENTS

| | | | |
|---|---|---|---|
| 2006/0272141 A1* | 12/2006 | Rudduck ................. | B23P 19/04 29/407.09 |
| 2012/0022719 A1 | 1/2012 | Matos | |
| 2012/0288772 A1* | 11/2012 | Yamada .................. | H01M 4/62 429/338 |

(Continued)

FOREIGN PATENT DOCUMENTS

| | | |
|---|---|---|
| CN | 103235968 A | 8/2013 |
| CN | 106200534 A | 12/2016 |

(Continued)

OTHER PUBLICATIONS

The World Intellectual Property Organization (WIPO) International Search Report for PCT/CN2017/088449 dated Mar. 16, 2018 6 pages.

*Primary Examiner* — Vernal U Brown
(74) *Attorney, Agent, or Firm* — Anova Law Group, PLLC (57) ABSTRACT

An unmanned aerial vehicle (UAV) including a detection device configured to detect that a disassembly operation has been performed on the UAV and a controller configured to determine whether the disassembly operation is an unauthorized disassembly operation, and prohibit the UAV from moving in response to the disassembly operation being the unauthorized disassembly operation, where the detection device is communicatively connected to the controller.

18 Claims, 5 Drawing Sheets

(56) References Cited

U.S. PATENT DOCUMENTS

2017/0004662 A1\* 1/2017 Gong ........................ G05D 1/00
2019/0278897 A1\* 9/2019 Zhang .................... G06Q 50/30

FOREIGN PATENT DOCUMENTS

| CN | 106354153 A | 1/2017 |
| CN | 106570942 A | 4/2017 |
| CN | 106794901 A | 5/2017 |
| CN | 106850523 A | 6/2017 |
| KR | 101668196 B1 | 10/2016 |

\* cited by examiner

FIG. 9 dealt # CONTROL METHOD FOR UNMANNED AERIAL VEHICLE AFTER THE UNMANNED AERIAL VEHICLE HAS BEEN DISASSEMBLED AND UNMANNED AERIAL VEHICLE

CROSS-REFERENCE TO RELATED APPLICATION

This application is a continuation application of International Application No. PCT/CN2017/088449, filed on Jun. 15, 2017, the entire content of which is incorporated herein by reference.

TECHNICAL FIELD

The present disclosure relates to the field of unmanned aerial vehicle (UAV), and more specifically, to a UAV control method after disassembly and a UAV.

BACKGROUND

In order to ensure the safety of a UAV during flight, some safety measures have been taken for the UAV. For example, the flight height of the UAV may be limited (e.g., the flight height of the UAV may be limited to 120 meters), the flight area of the UAV may be limited (e.g., the UAV may be limited to fly into airports, military bases, etc.), etc., and these safety measures are implemented at the factory by setting the components inside the UAV. However, some users may disassemble the UAV, then illegally modify the UAV by tempering or replacing the components inside the UAV. As such, the limitation on the flight height and flight area of the UAV may be removed. Once the limitation on the flight height and the flight area of the UAV are removed, the UAV may cause damages and losses.

SUMMARY

An aspect of the present disclosure provides an unmanned aerial vehicle (UAV). The UAV includes a detection device configured to detect that a disassembly operation has been performed on the UAV and a controller configured to determine whether the disassembly operation is an unauthorized disassembly operation, and prohibit the UAV from moving in response to the disassembly operation being the unauthorized disassembly operation. Further, the detection device is communicatively connected to the controller.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

The technical solutions provided in the embodiments of the present disclosure will be described below with reference to the drawings. However, it should be understood that the following embodiments do not limit the disclosure. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1:
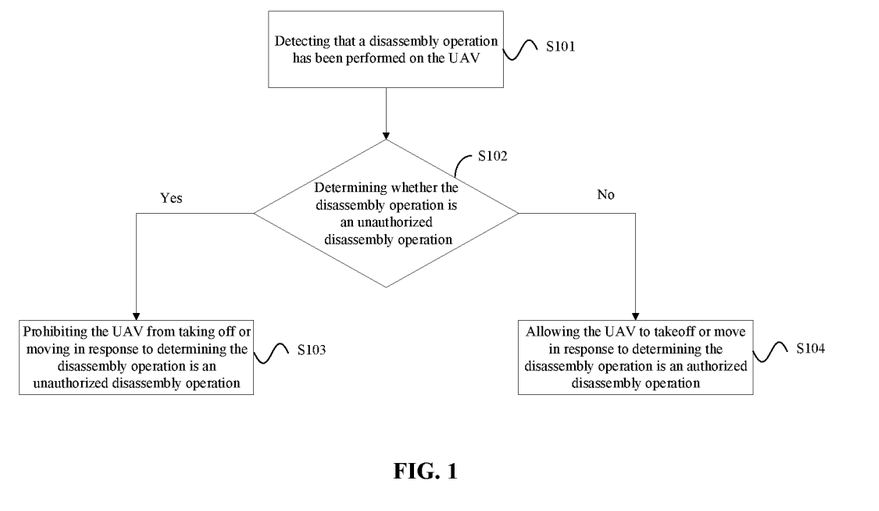
FIG. 1 is a flowchart of a UAV control method after disassembly according to an embodiment of the present disclosure.

FIG. 1 is a flowchart of a UAV control method after disassembly according to an embodiment of the present disclosure. The control method is described in detail below.

S101, detecting that a disassembly operation has been performed on the UAV.

S102, determining whether the disassembly operation is an unauthorized disassembly operation. If yes, proceed to S103, if not, proceed to S104.

S103, prohibiting the UAV from taking off or moving in response to determining the disassembly operation is the unauthorized disassembly operation.

S104, allowing the UAV to takeoff or move in response to determining the disassembly operation is an authorized disassembly operation.

Embodiments of the present disclosure may detect whether a disassembly operation has been performed on the UAV. Further, it may be possible to determine whether the disassembly operation is an unauthorized disassembly operation in response to detecting that the UAV has been disassembled.

After determining that the disassembly operation is the unauthorized disassembly operation, it may indicate that the disassembly operation is not an official (e.g., a manufacturer, a dealer, or a repairer of the unmanned vehicle) disassembly operation. When the disassembly operation is unauthorized, there is no guarantee that the components inside the UAV has not been replaced or tempered with. Therefore, the disassembly operation may be a disassembly operation to purposely replace or temper with the components inside the UAV, which may compromise the safety measures of the UAV, such as removing the flight height limit and the flight area limit of the UAV. Taking an unmanned aircraft as an example of the UAV, if the unmanned aircraft has no limitation on the flight height, the unmanned aircraft may fly upward without limitation. As such, the unmanned aircraft may hit a commercial aircraft flying in the sky, and the unmanned aircraft may cause a major disaster. Further, if the unmanned aircraft has no limitation on the flight area, the unmanned aircraft may fly into airports, which may seriously affect the take-off and landing of commercial aircrafts and even cause casualties. In addition, the unmanned aircraft may fly into military bases, and criminal may use the unmanned aircraft to spy on military intelligence and cause major losses to the country. As such, in order to avoid the occurrence of the situations mentioned above, in the present embodiment, when it is determined that the disassembly operation is an unauthorized disassembly operation, the unmanned aircraft may be prohibiting from taking off or flying. For example, if the UAV is an unmanned aircraft, the unmanned aircraft may be prohibited from taking off, such as by prohibiting the motor to start, such that the propeller of the unmanned aircraft may not rotate, and the unmanned aircraft may not take off. If the UAV is an unmanned vehicle or an unmanned ship, the unmanned vehicle or the unmanned ship may be prohibited from moving, such as by prohibiting the motor to start, thereby prohibiting the unmanned vehicle or the unmanned ship from moving.

In the present embodiment, after detecting that the UAV has been disassembled and determining that the disassembly operation is an unauthorized disassembly operation, the UAV may be prohibited from taking off or moving. As such, it may be possible to avoid the unauthorized replacement or tempering of the components inside the UAV after the unauthorized disassembly operation, and the UAV may not take off or move without the safety measures. Therefore, the loss caused by the UAV without the safety measures may be avoided, and the safety of the UAV may be improved.

In some embodiments, when it is determined that the disassembly operation is not an unauthorized disassembly operation, that is, the disassembly operation is an authorized disassembly operation, it may indicate that the disassembly operation may be an officially permitted disassembly operation. The officially permitted disassembly operation may be performed to repair a malfunctioning component inside the UAV. Since the disassembly operation is officially permitted, and the official may ensure that the components inside the UAV are not maliciously replaced or tempered with. As such, the safety measures of the UAV may not be compromised by replacing or tampering with the components inside the UAV. This type of disassembly operation does not change the safety measures of the UAV, therefore, the potentially hazardous situations mentioned above may not occur. Therefore, in the present embodiment, when it is determined that the disassembly operation is an authorized disassembly operation, the UAV may be allowed to take off or move. For example, the motor of the UAV may start normally, which ensures that the user may use the UAV normally after the authorized disassembly, thereby improving the user experience. In some embodiments, the official mentioned above may refer to the manufacturer, government authorized agency, etc.

Figure 2:
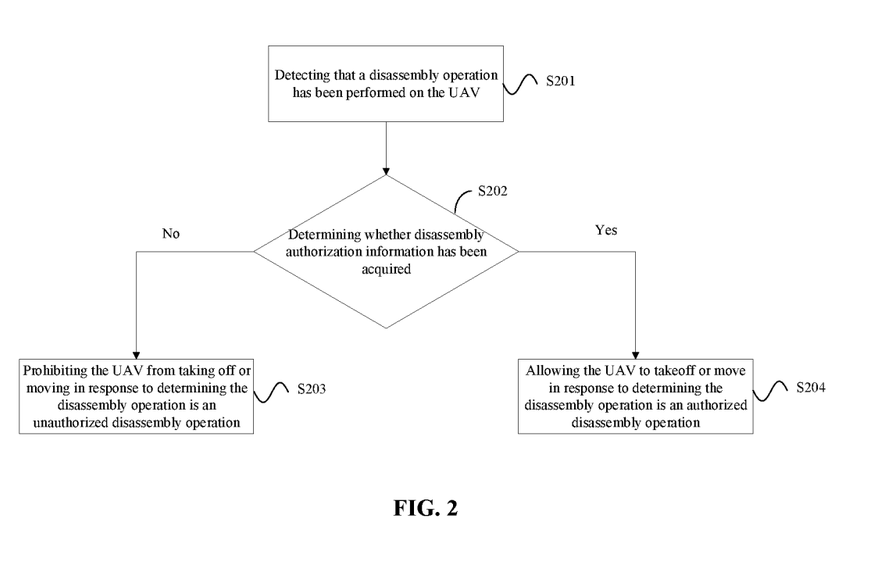
FIG. 2 is a flowchart of the UAV control method after disassembly according to another embodiment of the present disclosure.

FIG. 2 is a flowchart of the UAV control method after disassembly according to another embodiment of the present disclosure. The control method is described in detail below.

S201, detecting that a disassembly operation has been performed on the UAV.

S202, determining whether disassembly authorization information has been acquired. If not, proceed to S203, if yes, proceed to 204.

In the present embodiment, after detecting that the UAV has been disassembled, it may be possible to determine whether the disassembly authorization information has been acquired. When it is determined that the disassembly authorization information has not been acquired, it may indicate that the disassembly is not authorized, and S203 may be performed. When it is determined that the disassembly authorization information has been acquired, it may indicate that the disassembly is authorized, and S204 may be performed.

S203, prohibiting the UAV from taking off or moving in response to determining the disassembly operation is the unauthorized disassembly operation.

In the present embodiment, when the disassembly authorization information is not acquired, it is determined that the disassembly operation may be an unauthorized disassembly operation, and in order to ensure safety, the UAV may be prohibited from taking off or moving.

When the UAV is an unmanned aircraft, after determining that the disassembly operation is the unauthorized operation, the unmanned aircraft may be prohibited from taking off. In particular, the prohibition of the unmanned aircraft from taking off may be that after the unmanned aircraft receives a takeoff control command from a remote controller paired with the unmanned aircraft, the flight controller of the unmanned aircraft may ignore the takeoff control command. That is, the unmanned aircraft may not respond to the takeoff control command and refuse to start the motor.

When the UAV is an unmanned vehicle or an unmanned ship, after determining that the disassembly operation is the unauthorized operation, the unmanned vehicle or the unmanned ship may be prohibited from moving. In particular, the prohibition of the unmanned vehicle or the unmanned ship from moving may be that after the unmanned vehicle or the unmanned ship receives a moving control command from a remote controller paired with the unmanned vehicle or the unmanned ship, the unmanned vehicle or the unmanned ship may ignore the moving control command. That is, the unmanned vehicle or the unmanned ship may not respond to the moving control command and refuse to start the motor.

In some embodiments, when the UAV is prohibited from taking off or moving, the control of a gimbal or a camera of the UAV may be allowed, such as allowing the remote control to control the gimbal or the camera of the UAV. That is, the gimbal or the camera may respond to a control command in response to receiving the control command sent by the remote controller.

In some embodiments, when the UAV is prohibited from taking off or moving, the control of the gimbal or the camera of the UAV may be prohibited, such as prohibiting the remote control from controlling the gimbal or the camera of the UAV. For example, the gimbal or the camera may ignore the control command in response to receiving the control command sent by the remote controller. That is, the gimbal or the camera may not respond to the control command.

S204, allowing the UAV to takeoff or move in response to determining the disassembly operation is the authorized disassembly operation.

In the present embodiment, when the disassembly authorization information is acquired, it is determined that the disassembly operation may be an authorized disassembly operation. In order to ensure the normal use of the UAV, the UAV may be allowed to take off or move.

When the UAV is an unmanned aircraft, after determining that the disassembly operation is the authorized disassembly operation, the unmanned aircraft may be allowed to take off. In particular, allowing the unmanned aircraft to take off may be that after the unmanned aircraft receives a takeoff control command from the remote controller paired with the unmanned aircraft, the flight controller of the unmanned aircraft may respond to the takeoff control command, start the motor, and drive the unmanned aircraft to take off.

When the UAV is an unmanned vehicle or an unmanned ship, after determining that the disassembly operation is the authorized disassembly operation, the unmanned vehicle or the unmanned ship may be allowed to move. In particular, allowing the unmanned vehicle or the unmanned ship to move may be that after the unmanned vehicle or the unmanned ship receives a moving control command from the remote controller paired with the unmanned vehicle or the unmanned ship, the unmanned vehicle or the unmanned ship may respond to the moving control command, start the motor, and drive the unmanned vehicle or the unmanned ship.

The acquired disassembly authorization information mentioned above may be acquired before detecting that a disassembly operation has been performed on the UAV. Therefore, if the disassembly operation is the authorized disassembly operation, before disassembling the UAV, a licensor may input the disassembly authorization information to the UAV. After the UAV acquires the disassembly authorization information, the UAV may be disassembled. Since the disassembly authorization information is acquired before the disassembly, it may be determined that the disassembly operation after acquiring the disassembly authorization information is the authorized disassembly operation.

In addition, the acquired disassembly authorization information mentioned above may be acquired after detecting that a disassembly operation has been performed on the UAV. Therefore, if the disassembly operation is the authorized disassembly operation, after disassembling the UAV, a licensor may input the disassembly authorization information to the UAV. After the UAV acquires the disassembly authorization information, it may be determined that the disassembly operation after acquiring the disassembly authorization information is the authorized disassembly operation.

In some embodiments, the disassembly authorization information may be a disassembly authorization password. Therefore, the UAV may receive the password input by the licensor and determine whether the password matches a predetermined disassembly authorization password. If the password matches the predetermined disassembly authorization password, it may be determined that the disassembly authorization password is acquired. If the password does not match the predetermined disassembly authorization password, it may be determined that the disassembly authorization password is not acquired.

Further, the disassembly authorization information may be acquired through an input device of the UAV. The input device may be an input/output port. For example, the disassembly authorization information may be stored in a removable drive or a SD card. When the removable drive or the SD card is inserted into the input/output port of the UAV, the UAV may read the disassembly authorization information. Alternatively, the input device may be an input/output interface. For example, the licensor may input the corresponding disassembly authorization information through the input/output interface. Taking the disassembly authorization information is a disassembly authorization password as an example, the input device may be an interactive interface for controlling a terminal of the UAV, and the interactive interface of the terminal may display a page for prompting the input of the disassembly authorization password. The terminal may acquire the disassembly authorization password input by the user through the interactive interface, and the disassembly authorization password may be one or more of a number, a letter, and a character. In addition, the input device may be a terminal that controls the UAV. The terminal may download the disassembly authorization information on the official website of the UAV. When the terminal is in communication connection with the UAV, the UAV may acquire the disassembly authorization information downloaded on the terminal.

It should be noted that the disassembly authorization information mentioned above may be owned by an official licensee.

In the present embodiment, after detecting that the UAV has been disassembled and the disassembly authorization information has not been acquired, it may be determined that the disassembly operation is an unauthorized disassembly operation, and the UAV may be prohibited from taking off or moving. As such, it may be possible to avoid the unauthorized replacement or tempering of the components inside the UAV after the unauthorized disassembly operation, and the UAV may not take off or move without the safety measures. Therefore, the loss caused by the UAV without the safety measures may be avoided, and the safety of the UAV may be improved.

Figure 3:
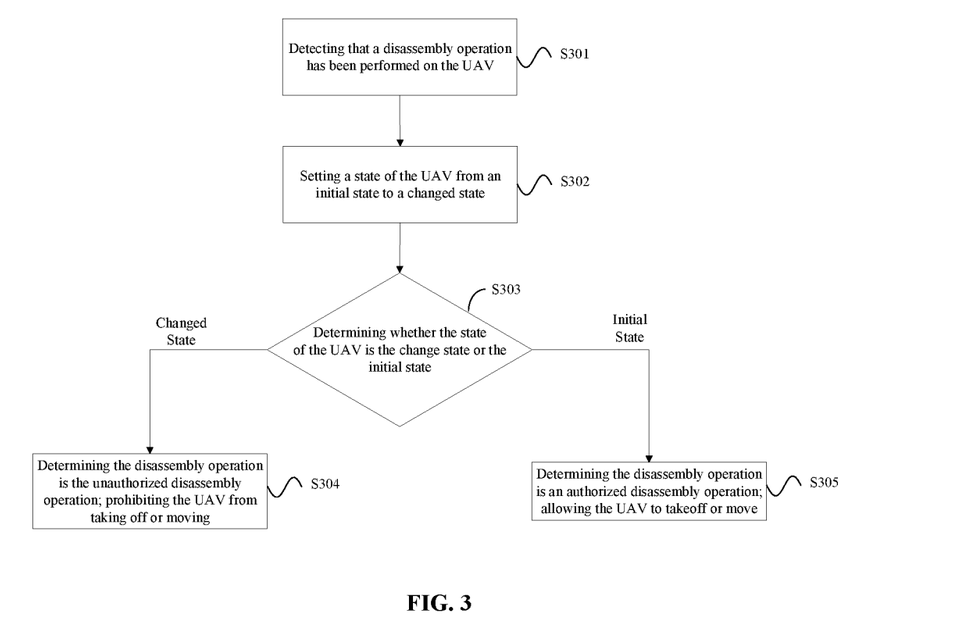
FIG. 3 is a flowchart of the UAV control method after disassembly according to yet another embodiment of the present disclosure.

FIG. 3 is a flowchart of the UAV control method after disassembly according to yet another embodiment of the present disclosure. The control method is described in detail below.

S301, detecting that a disassembly operation has been performed on the UAV.

S302, setting a state of the UAV from an initial state to a changed state.

In the present embodiment, the state in which the UAV is assembled in the factory may be the initial state. Further, the initial state may indicate that the UAV has not been disassembled, and the changed state may indicate that the UAV has been disassembled. When it is detected that the UAV has been disassembled, the state of the UAV may be set from the initial state to the changed state. If the disassembly operation is an unauthorized disassembly operation, the state of the UAV may remain changed and may not be reset to the initial state by itself. If the disassembly operation is an authorized disassembly operation, the state of the UAV may be reset to the initial state from the changed state.

In some embodiments, when the disassembly operation is the authorized disassembly operation, state reset authorization information may be acquired. The state reset authorization information may be used to indicate that the state of the UAV may be reset to the initial state, and the state of the UAV may be reset to the initial state based on the acquired state reset authorization information.

For details of acquiring the state reset authorization information, reference may be made to the acquisition of the disassembly authorization information provided earlier, and details will be not described herein again.

When the disassembly operation is performed by the user instead of an officially authorized disassembly operation and the user does not have the state reset authorization information, after the user disassembles the UAV, the user may not input the state reset authorization information to the UAV. Correspondingly, the UAV may not acquire the state reset authorization information, the UAV may not reset the changed state to the initial state, and the state of the UAV may remain as the changed state. When the disassembly operation is an officially authorized disassembly operation and the authorized licensor has the state reset authorization information, the authorized licensor may input the state reset authorization information to the UAV. After the UAV acquires the state reset authorization information, the state of the UAV may be set to the initial state based on the state reset authorization information, and the state of the UAV may be the initial state.

In some embodiments, the state reset authorization information may include authorizer identification information. In the present embodiment, after the state reset authorization information is acquired, the authorizer who authorized the current state reset of the UAV may be recorded based on the authorizer identification information. As such, the number of times the UAV was disassembled and the reasons for each disassembly may be analyzed based on the recorded information.

S303, determining whether the state of the UAV is the changed state or the initial state. If it is the changed state, proceed to S304, if is it the initial state, proceed to 305.

In the present embodiment, the current state of the UAV may be determined. When it is determined that the current state of the UAV is the changed state, it may indicate that disassemble is not authorized. As such, the disassembly operation may be determined to be an unauthorized disassembly operation, and S304 may be performed. Further, when it is determined that the current state of the UAV is the initial state, it may indicate that disassemble is authorized. As such, the disassembly operation may be determined to be an authorized disassembly operation, and S305 may be performed S304, prohibiting the UAV from taking off or moving in response to determining the disassembly operation is the unauthorized disassembly operation.

In the present embodiment, when it is determined that the state of the UAV is the changed state, the disassembly operation may be determined to be the unauthorized disassembly operation. In order to ensure safety, the UAV may be prohibited from taking off or moving.

S305, allowing the UAV to takeoff or move in response to determining the disassembly operation is the authorized disassembly operation.

In the present embodiment, when it is determined that the state of the UAV is the initial state, the disassembly operation may be determined to be the authorized disassembly operation. In order to ensure the normal use UAV, the UAV may be allowed to take off or move.

In the present embodiment, after detecting that the UAV has been disassembled and the disassembly authorization information has not been acquired, it may be determined that the disassembly operation is an unauthorized disassembly operation, and the UAV may be prohibited from taking off or moving. As such, it may be possible to avoid the unauthorized replacement or tempering of the components inside the UAV after the unauthorized disassembly operation, and the UAV may not take off or move without the safety measures. Therefore, the loss caused by the UAV without the safety measures may be avoided, and the safety of the UAV may be improved.

Figure 4:
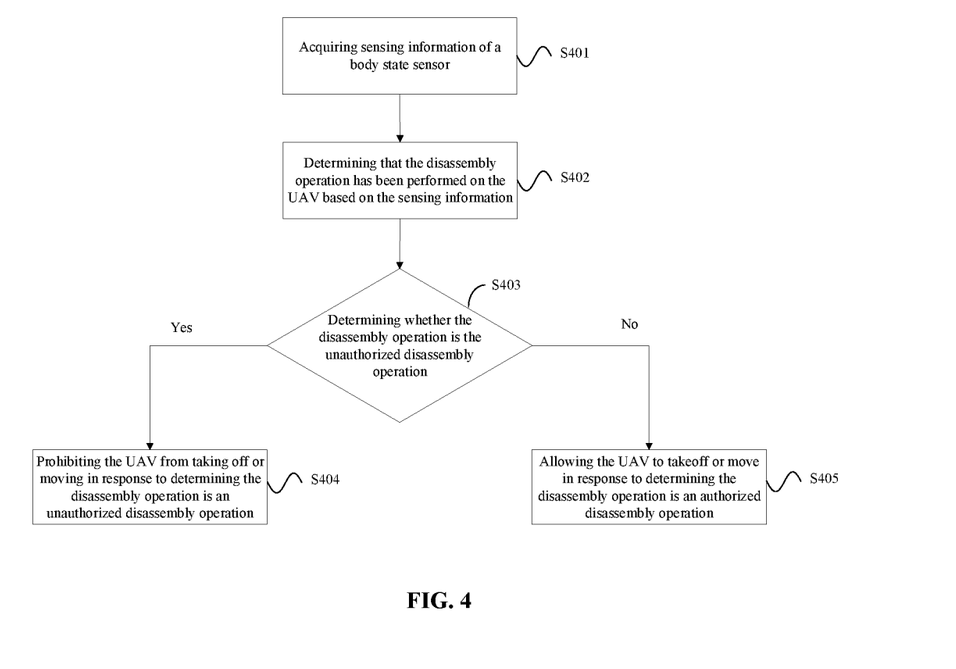
FIG. 4 is a flowchart of the UAV control method after disassembly according to still another embodiment of the present disclosure.

FIG. 4 is a flowchart of the UAV control method after disassembly according to still another embodiment of the present disclosure. The control method is described in detail below.

S401, acquiring sensing information of a body state sensor.

S402, determining that the disassembly operation has been performed on the UAV based on the sensing information.

The UAV of the present embodiment may include an upper body cover and a lower body cover, and a body state sensor may be disposed at a joint between the upper body cover and the lower body cover. When the disassembly operation has not been performed on the UAV, the upper body cover may be engaged with the lower body cover, and the body state sensor at the joint may sense the engagement between the upper body cover and the lower body cover. When the disassembly operation has been performed on the UAV, the upper body cover may not be engaged with the lower body cover as the upper body cover may be separated from the lower body cover, and the body state sensor may sense the disengagement between the upper body cover and the lower body cover. Therefore, the body state sensor disposed at the joint of the upper body cover and the lower body cover may perform sensing in real time. In the present embodiment, the sensing information of the body state sensor may be acquired, and the detection of whether the disassembly operation has been performed on the UAV may be determined based on the sensing information.

In one embodiment, the body state sensor may include a light sensor, which may be used to sense light. Since the light sensor may be disposed at the joint between the upper body cover and the lower body cover of the UAV, the light sensor may not be exposed to light when the disassembly operation has not been performed on the UAV. As such, the light sensor may not sense light. When the disassembly operation has been performed on the UAV, the light sensor may be exposed to light, and the light sensor may sense light. Therefore, the sensing information sensed by the light sensor may be different when the disassembly operation has been performed on the UAV and the disassembly operation has not been performed on the UAV. As such, in the present embodiment, whether the disassembly operation has been performed on the UAV may be detected based on the sensing information of the light sensor. When the sensing information of the light sensor indicates the light sensor detects light, it may indicate that the upper body cover is separated from the lower body cover, therefore, it may be detected that the disassembly operation has been performed on the UAV. When the sensing information of the light sensor indicates that the light sensor does not sense light, it may indicate that the upper body cover is not separated from the lower body cover, therefore, it may be detected that the disassembly operation has not been performed on the UAV.

In some embodiments, an alignment groove may be disposed inside the lower body cover, and the light sensor may be disposed in the alignment groove. Further, an alignment protrusion may be disposed inside the upper body cover, and the alignment protrusion may match with the alignment groove. When the alignment protrusion is inserted into the alignment groove, the light sensor may not sense light. In addition, when the alignment protrusion is pulled out of the alignment groove, the light sensor may sense light. In particular, the light sensor may be disposed at the bottom of the alignment groove. Since the light sensor may be disposed at the joint of the alignment protrusion and the alignment groove, the light inside the UAV may not affect the sensing of the light sensor, thereby improving the accuracy of the use of the light sensor to detect whether the disassembly operation has been performed on the UAV.

In one embodiment, the body state sensor may include a limit sensor which may be used to sense a mechanical position change. Since the limit sensor may be disposed at the joint between the upper body cover and the lower body cover of the UAV, the mechanical position of the limit sensor may not change when the disassembly operation has not been performed on the UAV. As such, the limit sensor may not sense a change in the mechanical position. When the disassembly operation has been performed on the UAV, the upper body cover may be separated from the lower body cover, and the mechanical position of the limit sensor disposed at the joint between the upper body cover and the lower body cover may change. As such, the limit sensor may sensor a change in the mechanical position. Therefore, the sensing information sensed by the limit sensor may be different when the disassembly operation has been performed on the UAV and the disassembly operation has not been performed on the UAV. As such, in the present embodiment, whether the disassembly operation has been performed on the UAV may be detected based on the sensing information of the limit sensor. When the sensing information of the limit sensor indicates the change in the mechanical position, it may indicate that the upper body cover is separated from the lower body cover, therefore, it may be detected that the disassembly operation has been performed on the UAV. When the sensing information of the limit sensor indicates that the mechanical position has not changed, it may indicate that the upper body cover is not separated from the lower body cover, therefore, it may be detected that the disassembly operation has not been performed on the UAV.

In some embodiments, an alignment groove may be disposed inside the lower body cover, and the limit sensor may pass through a side wall of the alignment groove. Further, an alignment protrusion may be disposed inside the upper body cover, and the alignment protrusion may match with the alignment groove. When the alignment protrusion is inserted into the alignment groove, the limit sensor may abut the side wall of the alignment groove, and the limit sensor may sense no change in the mechanical position. When the alignment protrusion is pulled out of the alignment groove, the limit sensor may spring toward the alignment groove, and the limit sensor may sense a change in the mechanical position.

It should be noted that body state sensor of the present embodiment is not limited to the light sensor and the limit sensor described above.

Figure 5:
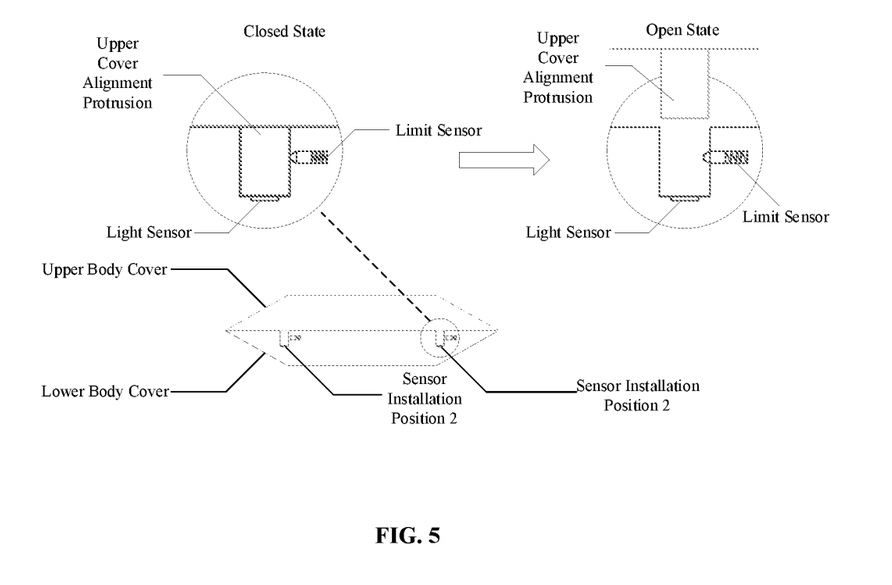
FIG. 5 is a diagram of positions of a light sensor and a limit sensor according to an embodiment of the present disclosure.

In one embodiment, the body state sensor may include a light sensor and a limit sensor. More specifically, one or more light sensors and limit sensors may be used. FIG. 5 is a diagram of positions of a light sensor and a limit sensor according to an embodiment of the present disclosure. As shown in FIG. 5, when the disassembly operation has not been performed on the UAV, the upper body cover and the lower body cover may be in a close state. When the disassembly operation has been performed on the UAV, the upper body cover and the lower body cover may be in an open state.

In some embodiments, the upper body cover and the lower body cover may also be a left body cover and a right body cover, or a front body cover and a rear body cover, which is not limited in the present embodiment.

S403, determining whether the disassembly operation is the unauthorized disassembly operation. If yes, proceed to S404, if not, proceed to S405.

S404, prohibiting the UAV from taking off or moving in response to determining the disassembly operation is the unauthorized disassembly operation.

S405, allowing the UAV to takeoff or move in response to determining the disassembly operation is the authorized disassembly operation.

For the specific implementation process of S403 to S405 in the present embodiment, reference may be made to the related description in the embodiments of FIG. 1 to FIG. 3, and details are not described herein again.

In the present embodiment, after using the body state sensor to detect that the disassembly operation has been performed on the UAV and determining the disassembly operation is the unauthorized disassembly operation, the UAV may be prohibited from taking off or moving. As such, it may be possible to avoid the unauthorized replacement or tempering of the components inside the UAV after the unauthorized disassembly operation, and the UAV may not take off or move without the safety measures. Therefore, the loss caused by the UAV without the safety measures may be avoided, and the safety of the UAV may be improved.

Figure 6:
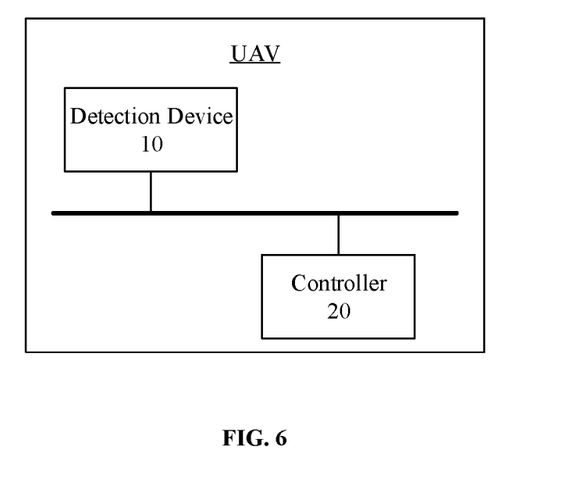
FIG. 6 is a structural diagram of a UAV according to an embodiment of the present disclosure.

FIG. 6 is a structural diagram of a UAV according to an embodiment of the present disclosure. As shown in FIG. 6, the UAV of the present embodiment includes a detection device 10 and a controller 20. The detection device 10 may be communicatively connected to the controller 20.

The detection device 10 may be configured to detect whether a disassembly operation has been performed on the UAV. The disassembly operation of the UAV generally requires a housing of the UAV to be opened, such that the components inside the UAV may be exposed to light. As such, the detection device 10 may detect whether the disassembly operation has been performed on the UAV by detecting whether the components inside the UAV are exposed to light. Alternatively, the components inside the UAV may be replaced or modified. As such, a movement operation may be performed on the components inside the UAV, the detection device 10 may detect whether the disassembly operation has been performed on the UAV based on the presence of the movement operation. It should be noted that the detection device 10 may detect that the disassembly operation has been performed on the UAV based on the respective actions of the disassembly operation process, and the present embodiment is not limited to the example described above.

The controller 20 may be configured to determine whether the disassembly operation is an unauthorized disassembly operation. In response to determining the disassembly operation is the unauthorized disassembly operation, the UAV may be prohibited from taking off or moving.

In some embodiments, the controller 20 may be further configured to allow the UAV to take off or move in response to determining the disassembly operation is the authorized disassembly operation.

In one embodiment, the controller 20 may be configured to determine whether the disassembly authorization information has been acquired, where the disassembly authorization information may be used to authorize the disassembly operation is authorized; determine the disassembly operation is the authorized disassembly operation in response to acquiring the disassembly authorization information; and determine the disassembly operation is the unauthorized disassembly operation in response to not acquiring the disassembly authorization information.

In some embodiments, the disassembly authorization information may be a disassembly authorization password.

In one embodiment, the detection device 10 may be further configured to set the state of the UAV from the initial state to the changed state in response to detecting the disassembly operation has been performed on the UAV.

In some embodiments, the controller 20 may be configured to determine whether the state of the UAV is the changed state or the initial state; determine the disassembly operation is the unauthorized disassembly operation in response to the state of the UAV is the changed state; and determine the disassembly operation is the authorized disassembly operation in response to the state of the UAV is the initial state.

In some embodiments, the detection device 10 may be further configured to acquire the state reset authorization information before determining whether the disassembly operation may be the unauthorized disassembly operation. The state reset authorization information may be used to indicate that the state of the UAV is reset to the initial state, and the state of the UAV may be reset to the initial state based on the state reset authorization information.

In one embodiment, the UAV may be an unmanned aircraft. Correspondingly, the controller 20 may be a flight controller, and the flight controller may be specifically configured to prohibit the unmanned aircraft from taking off in response to the disassembly operation is the unauthorized disassembly operation.

In one embodiment, the UAV may be an unmanned vehicle or an unmanned ship. Correspondingly, the controller 20 may be a movement controller, and the movement controller may be specifically configured to prohibit the unmanned vehicle from moving in response to the disassembly operation is the unauthorized disassembly operation.

In one embodiment, the UAV may be an unmanned ship. Correspondingly, the controller 20 may be a movement controller, and the movement controller may be specifically configured to prohibit the unmanned ship from taking off in response to the disassembly operation is the unauthorized disassembly operation.

In some embodiments, the detection device 10 and the controller 20 described above may belong to a UAV control system.

The UAV of the present embodiment may be used to implement the technical solution of the method embodiment shown in any one of FIG. 1 to FIG. 3, the implementation principles and technical effects are similar, and details are not described herein again.

Figure 7:
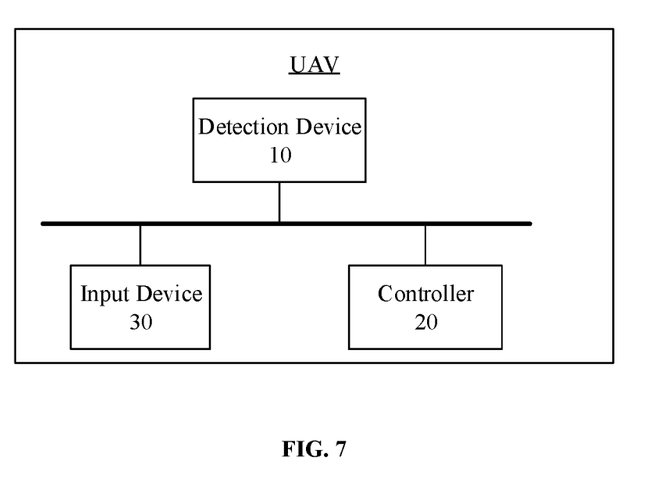
FIG. 7 is a structural diagram of a UAV according to another embodiment of the present disclosure.

FIG. 7 is a structural diagram of a UAV according to another embodiment of the present disclosure. As shown in FIG. 7, on the basis of the UAV shown in FIG. 6, the UAV of the present embodiment further includes an input device 30.

The input device 30 may be communicatively connected to the controller 20. The input device 30 may be configured to input the disassembly authorization information. The controller 20 may be further configured to acquire the disassembly authorization information through the input device 30.

The input device 30 may be communicatively connected to the detection device 10. The input device 30 may be configured to input the disassembly authorization information. The detection device 10 may be configured to acquire the disassembly authorization information through the input device 30.

The UAV of the present embodiment may be used to implement the technical solution of the method embodiment shown in any one of FIG. 1 to FIG. 3, the implementation principles and technical effects are similar, and details are not described herein again.

Figure 8:
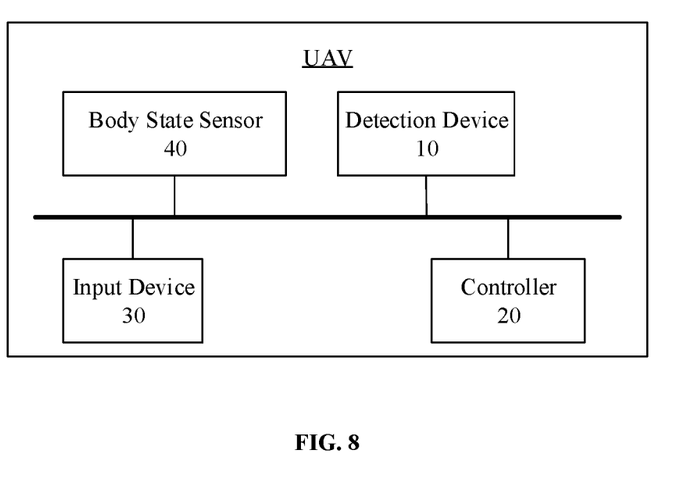
FIG. 8 is a structural diagram of a UAV according to yet another embodiment of the present disclosure.

FIG. 8 is a structural diagram of a UAV according to yet another embodiment of the present disclosure. As shown in FIG. 8, on the basis of the UAV shown in FIG. 6 or FIG. 7, the UAV of the present embodiment further includes a body state sensor 40. The body state sensor 40 may be disposed at the joint between the upper body cover and the lower body cover of the UAV, and the body state sensor 40 may be configured to output the sensing information of the body state sensor to the detection device 10.

The detection device 10 may be configured to acquire the sensing information and detect whether the disassembly operation has been performed on the UAV based on the sensing information.

In one embodiment, the body state sensor 40 may include a light sensor. The light sensor may be configured to output sensing information of the light sensor when the light sensor detects light.

The detection device 10 may be configured to detect that the disassembly operation has been performed on the UAV based on the sensing information indicating that the light sensor detects light.

In some embodiments, an alignment groove may be disposed inside the lower body cover, and the light sensor may be disposed in the alignment groove. Further, an alignment protrusion may be disposed inside the upper body cover, and the alignment protrusion may match with the alignment groove. When the alignment protrusion is inserted into the alignment groove, the light sensor may not sense light. In addition, when the alignment protrusion is pulled out of the alignment groove, the light sensor may sense light.

In one embodiment, the body state sensor 40 may include a limit sensor. The limit sensor may be configured to output sensing information of the limit sensor to the detection device 10 when limit sensor detects a change in the mechanical position. The detection device 10 may be configured to detect that the disassembly operation has been performed on the UAV based on the sensing information indicating that the limit sensor detects a change in the mechanical position.

In some embodiments, an alignment groove may be disposed inside the lower body cover, and the limit sensor may pass through a side wall of the alignment groove. Further, an alignment protrusion may be disposed inside the upper body cover, and the alignment protrusion may match with the alignment groove. When the alignment protrusion is inserted into the alignment groove, the limit sensor may abut the side wall of the alignment groove, and the limit sensor may sense no change in the mechanical position. When the alignment protrusion is pulled out of the alignment groove, the limit sensor may spring toward the alignment groove, and the limit sensor may sense a change in the mechanical position.

It should be noted that the upper body cover, the lower body cover, the light sensor, and the limit sensor are not shown in FIG. 8. However, reference may be made to the example shown in FIG. 5 for the upper body cover, the lower body cover, the light sensor, and the limit sensor.

The UAV of the present embodiment may be used to implement the technical solution of the method embodiment shown in FIG. 4, the implementation principles and technical effects are similar, and details are not described herein again.

Figure 9:
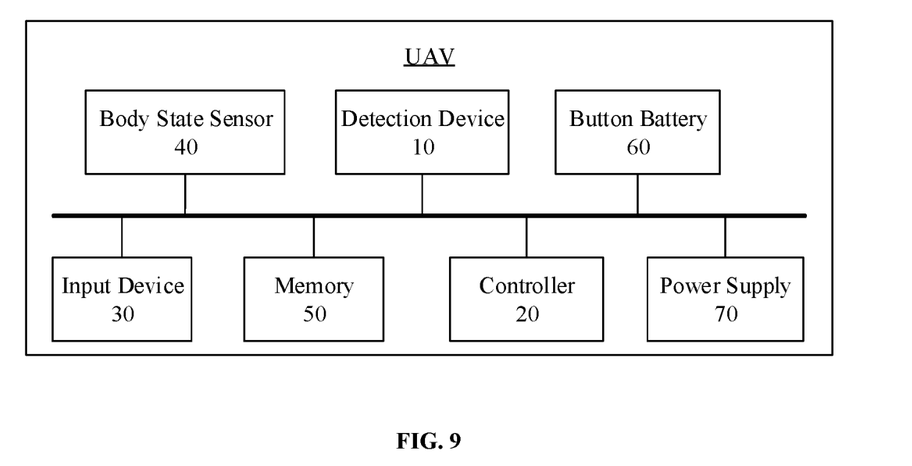
FIG. 9 is a structural diagram of a UAV according to still another embodiment of the present disclosure.

FIG. 9 is a structural diagram of a UAV according to still another embodiment of the present disclosure. As shown in FIG. 9, on the basis of any one of the UAV embodiments described above, the UAV of the present embodiment further includes a memory 50.

The state reset authorization information may further include the identification information of the authorizer, and the memory 50 may be configured to record that the current state reset of the UAV is authorized by the authorizer the based on the identification information In addition, when the UAV includes the body state sensor 40, the body state sensor 40 may be configured to output the sensing information of the body state sensor 40 to the memory 50.

In some embodiments, the memory 50 may be configured to store the sensing information of the body state sensor 40.

In some embodiments, the detection device 10 may be configured to acquire the sensing information from the memory 50.

In some embodiments, the UAV may further include a button battery 60, and the button battery 60 may be electrically connected to the detection device 10. The button battery 60 may be configured to supply power tot eh detection device 10. The button battery 60 of the present embodiment may supply power to the detection device 10 in real time instead of changing the on/off operation of the UAV, such that the detection device 10 may detect whether the disassembly operation has been performed on the UAV in real time.

In some embodiments, the button battery 60 may also be electrically connected to the body state sensor 40 to supply power to the body state sensor 40, such that the body state senor 40 may perform sensing in real time.

In some embodiments, the button battery 60 may also be electrically connected to the memory 50 to supply power to the memory 50, such that the memory 50 may store the related information, such as the sensing information of the body state sensor 40, in real time.

In some embodiments, the button battery 60 may also be electrically connected to the input device 30 to supply power to the input device 30.

In some embodiments, the UAV may further include a power supply 70. The button battery 60 may be configured to obtain power from the power supply 70 of the UAV. That is, the power supply 70 of the UAV may be used to charge the button battery 60, which may avoid the replacement of the button battery 60 when the button battery is out of power. The power supply 70 of the UAV may be the battery of the UAV, which may be removed out of the UAV and charged.

Those skilled in the art should know that: all or part of the steps of the method embodiment may be implemented by related hardware instructed through a program, the program may be stored in a computer-readable storage medium, and the program is executed to execute the steps of the method embodiment; and the storage medium includes: various media capable of storing program codes, such as mobile storage equipment, a Read-Only Memory (ROM), a magnetic disk or a compact disc.

It should be noted that the foregoing embodiments are merely intended for describing the technical solutions of the present disclosure instead of limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An unmanned aerial vehicle (UAV), comprising:
a detection device configured to detect that a disassembly operation has been performed on the UAV; and
a controller configured to determine whether the disassembly operation is an unauthorized disassembly operation, and to prohibit the UAV from moving in response to the disassembly operation being the unauthorized disassembly operation;
wherein the detection device is communicatively connected to the controller; and
the detection device is configured to switch a state of the UAV from an initial state to a changed state; and the controller is configured to determine whether the state of the UAV is the changed state; determine the disassembly operation is the unauthorized disassembly operation in response to the state of the UAV being the changed state; and determine the disassembly operation is the authorized disassembly operation in response to the state of the UAV being the initial state.

2. The UAV of claim 1, wherein the controller is further configured to allow the UAV to move in response to the disassembly operation being an authorized disassembly operation.

3. The UAV of claim 1, wherein the controller is configured to determine whether disassembly authorization information has been acquired, the disassembly authorization information indicating that the disassembly operation is authorized; determine the disassembly operation is an authorized disassembly operation in response to acquiring the disassembly authorization information; and determine the disassembly operation is the unauthorized disassembly operation in response to not acquiring the disassembly authorization information.

4. The UAV of claim 3, further comprising:
an input device configured to receive the disassembly authorization information, and the input device being communicatively connected to the controller.

5. The UAV of claim 4, wherein the disassembly authorization information is a disassembly authorization password.

6. The UAV of claim 1, wherein the detection device is further configured to acquire state reset authorization information before determining whether the disassembly operation is the unauthorized disassembly operation, the state reset authorization information indicating that the state of the UAV being reset to the initial state; and to reset the state of the UAV to the initial state based on the state reset authorization information.

7. The UAV of claim 6, wherein the state reset authorization information includes identification information of an authorizer, and the UAV further includes a memory configured to record that a current state reset of the UAV is authorized by the authorizer based on the identification information.

8. The UAV of claim 7, further comprising:
an input device configured to input the disassembly authorization information, and the input device is communicatively connected to the detection device.

9. The UAV of claim 1, further comprising:
a body state sensor disposed at a joint between an upper body cover and a lower body cover of the UAV, and the body state sensor being configured to output sensing informant of the body state sensor to the detection device; and the detection device being further configured to acquire the sensing information, and detect that the disassembly operation has been performed on the UAV based on the sensing information.

10. The UAV of claim 9, further comprising:
a memory;
wherein:
the body state sensor is configured to output the sensing information of the body state sensor to the memory;

the memory is configured to store the sensing information of the body state sensor; and the detection device is configured to acquire the sensing information from the memory.

11. The UAV of claim 10, wherein:

the body state sensor includes a light sensor;

the light sensor is configured to output sensing information to the detection device when the light sensor detects light; and the detection device is further configured to detect that the disassembly operation has been performed on the UAV based on the sensing information indicating the light sensor has detected light.

12. The UAV of claim 11, wherein:

an inner surface of the lower body cover of the UAV includes an alignment groove, and the light sensor is disposed in the alignment groove;

an inner surface of the upper body cover of the UAV includes an alignment protrusion, and the alignment protrusion is coupled with the alignment groove;

when the alignment protrusion is inserted into the alignment groove, the light sensor does not detect light; and when the alignment protrusion is pulled out of the alignment groove, the light sensor detects light.

13. The UAV of claim 9, wherein the body state sensor includes a limit sensor, the limit sensor being configured to output sensing information to the detection device when the limit sensor detects a change in a mechanical position; and the detection device is further configured to detect that the disassembly operation has been performed on the UAV based on the sensing information indicating the change in the mechanical position.

14. The UAV of claim 13, wherein:

an inner surface of the lower body cover of the UAV includes an alignment groove, and the limit sensor passes through a side wall of the alignment groove;

an inner surface of the upper body cover of the UAV includes an alignment protrusion, and the alignment protrusion is matched with the alignment groove;

when the alignment protrusion is inserted into the alignment groove, the limit sensor abuts against the side wall of the alignment groove, and the mechanical position of the limit sensor does not change; and when the alignment protrusion is pulled out of the alignment groove, the limit sensor springs in a direction toward the alignment groove, and the mechanical position of the limit sensor changes.

15. The UAV of claim 1, further comprising:

a button battery configured to supply power to the detection device, and the button battery being electrically connected to the detection device.

16. The UAV of claim 15, wherein the button battery is further configured to obtain power from a power supply of the UAV.

17. The UAV of claim 1, wherein:

when the UAV is an unmanned aircraft, the controller is a flight controller, and the flight controller is configured to prohibit the unmanned aircraft from taking off in response to determining the disassembly operation is the unauthorized disassembly operation.

18. The UAV of claim 1, wherein:

when the UAV is an unmanned vehicle or an unmanned vessel, the controller is a movement controller, and the movement controller is configured to prohibit the unmanned vehicle or the unmanned vessel from moving in response to determining the disassembly operation is the unauthorized disassembly operation.

* * * * *